United States Patent [19]
Grenet et al.

[11] Patent Number: 5,293,002
[45] Date of Patent: Mar. 8, 1994

[54] ELECTRICAL DEVICE WITH EMBEDDED RESIN AND VISIBLE RESIN INLET AND DISCHARGE DUCTS

[75] Inventors: Gilles Grenet, Mornac; Catherine Ullmann, Lyons; Gérard Pitault, Ruelle, all of France

[73] Assignee: Telemecanique, Rueil-Malmaison, France

[21] Appl. No.: 856,652

[22] Filed: Mar. 20, 1992

[30] Foreign Application Priority Data

Mar. 20, 1991 [FR] France ............... 91 03381

[51] Int. Cl.$^5$ ........................... H01L 23/28
[52] U.S. Cl. ................... 174/52.2; 264/328.1
[58] Field of Search ........ 174/52.2, 52.3, 52.6, 174/52.1; 264/297.2, 328.1; 164/410

[56] References Cited

U.S. PATENT DOCUMENTS

| | | | |
|---|---|---|---|
| 4,085,308 | 4/1978 | Youngquist | 219/309 |
| 4,546,812 | 10/1985 | Tiegel | 164/130 |
| 4,650,626 | 3/1987 | Kurokawa | 264/278 |
| 4,957,682 | 9/1990 | Kobayashi et al. | 264/255 |

FOREIGN PATENT DOCUMENTS 2041047 2/1971 Fed. Rep. of Germany .
485095 12/1917 France .
2302179 9/1976 France .
2648745 12/1990 France .
WO82/01630 5/1982 PCT Int'l Appl. .
2033828 5/1980 United Kingdom .

*Primary Examiner*—Leo P. Picard
*Assistant Examiner*—Christopher Horgan
*Attorney, Agent, or Firm*—Young & Thompson

[57] ABSTRACT

A proximity detector has a casing containing a probe (4) and a printed circuit (3), the upper end of the casing being closed by a plug (35) provided with a filling orifice (14) and with connecting-pins (36). The nozzle of a plastic injector (13) is fitted in position within the filling orifice, said nozzle being provided with two adjacent ducts. A hardenable resin is caused by centrifugation to flow into the casing via a first duct while simultaneously driving-out the air which is present within the casing via the second duct, thus ensuring rapid and efficient filling. When the casing has been filled and the resin has hardened, the injector (13) is cut-off in close proximity to the plug (35). Complete filling can be checked by inspecting the surface appearance of the two leading portions of solidified resin flux which are thus visible at the level of the orifice (14).

3 Claims, 3 Drawing Sheets

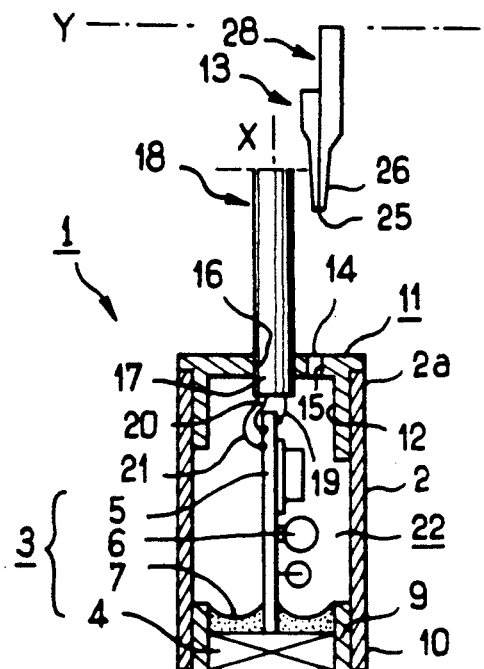
FIG_1
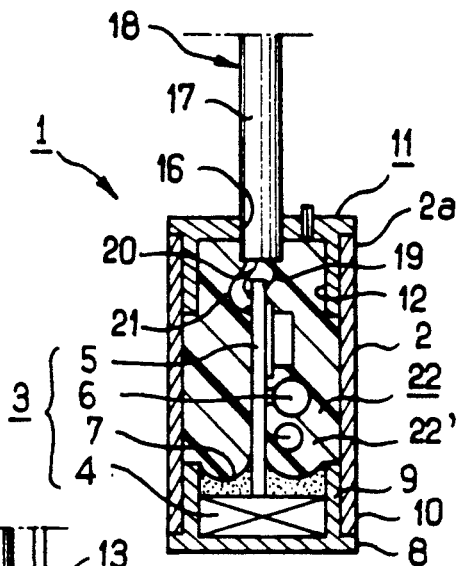
FIG_3
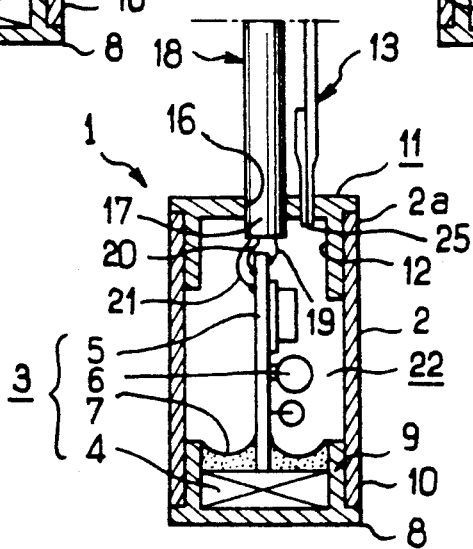
FIG_2
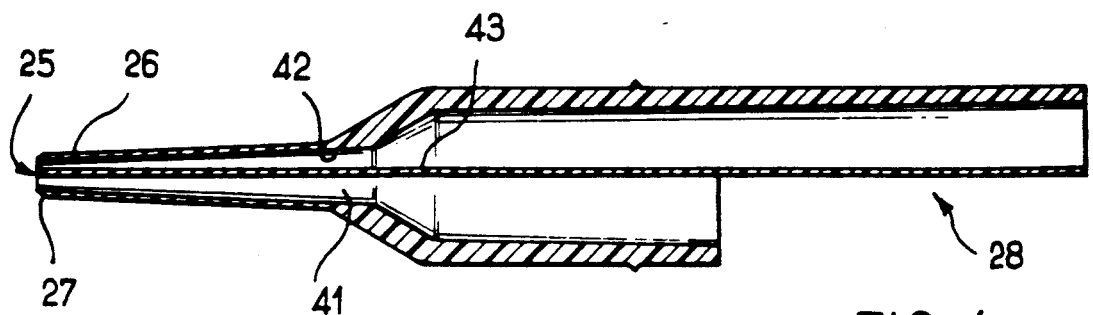
FIG_4

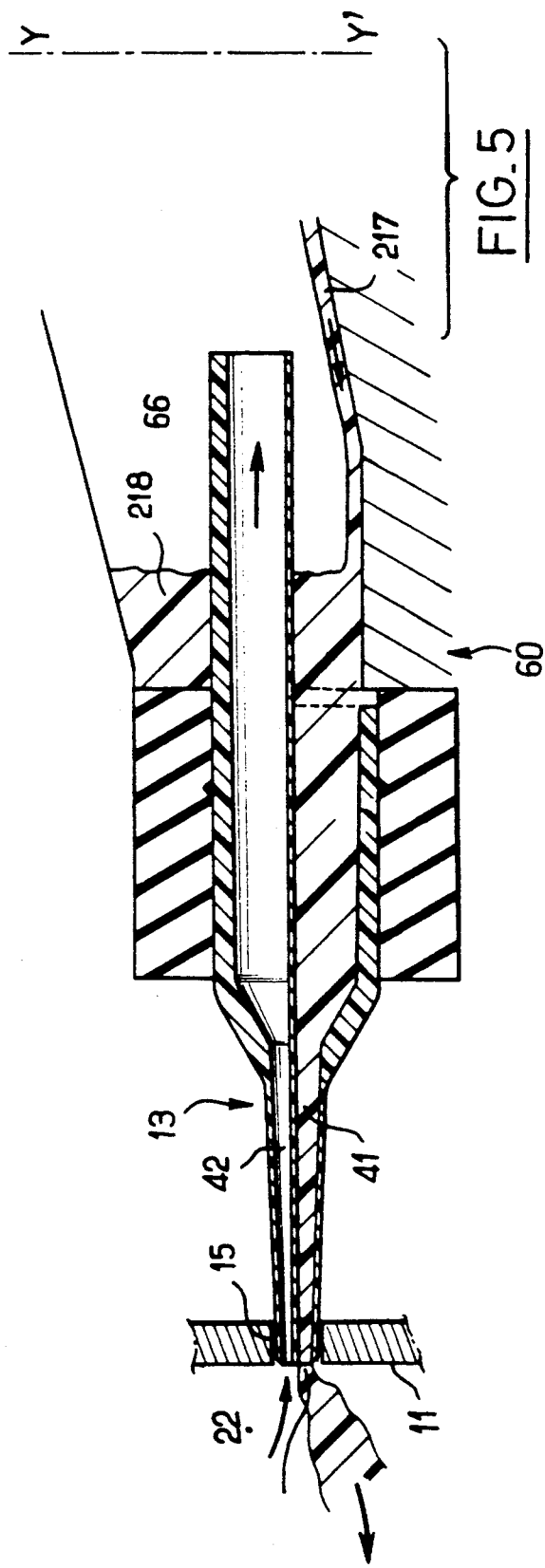
FIG._5
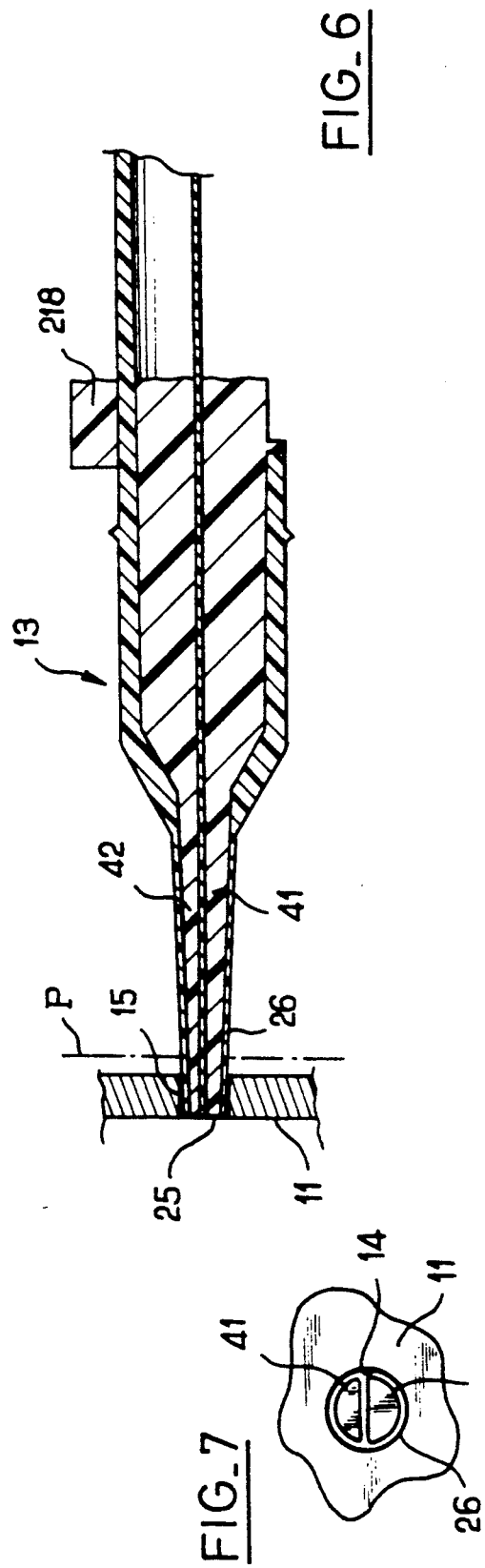
FIG._6
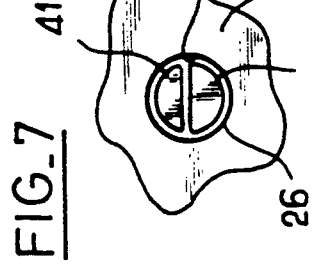
FIG._7

ELECTRICAL DEVICE WITH EMBEDDED RESIN AND VISIBLE RESIN INLET AND DISCHARGE DUCTS

BACKGROUND OF THE INVENTION

1. Field of the Invention

The present invention relates to a method for embedding in resin components which are located within the casing of an electrical device such as a proximity detector.

The invention is also concerned with an electrical device provided with a casing which is intended to house electric components, in particular a proximity detector in which a sensing probe is placed at one end of the casing while an opposite end of the casing is intended to be fitted with insulated and conductive electrical connecting means for supplying the detector and transmitting its output signals. Within the casing, the electrical components are embedded in a hardened insulating resin which fixes them in position and forms a mechanical joint by adhesion to the internal walls of the casing The injection of hardenable material is intended to endow the electrical device with very high reliability. This result is achieved by virtue of insensitivity to impacts or vibrations, electrical insulation of the components and total protection against fluid or atmospheric agents of the environment.

2. Description of the Prior Art

A known method of filling with resin as disclosed in patent No. FR-A-2 648 745 makes use of the centrifugation effect. While centrifugation of resin does produce satisfactory results, it is nevertheless found desirable to simplify and rationalize the implementation of this method.

The object of the invention is therefore both to satisfy the requirements of quality and reliability of the products obtained and to achieve the aims of simplicity of manufacture and short duration of the filling operation.

A further object of the invention is to obtain a particular configuration of the product in correlation with the application of the method.

SUMMARY OF THE INVENTION

In accordance with the invention, in order to embed in resin the components contained in the casing of an electrical device:

a) the device is fixed in an eccentric position on a centrifugation rotor by connecting an injection and discharge element to the casing of the electrical device, said element being provided with a filling duct for connecting the casing to a central zone of the rotor and with a discharge duct for connecting the interior of the casing to a discharge chamber;

b) the rotor is set in rotation in order to transfer by centrifugation a predetermined quantity of fluid resin from the central zone to the interior of the casing via the filling duct while air escapes from the casing via the discharge duct and rotation is maintained substantially until hardness of the resin has been restored.

While centrifugation is in progress, the resin passes into the casing and flows to that portion of the casing which is farthest away from the axis of the centrifugation rotor. The air is thus driven-out towards the axis and therefore towards the discharge duct of the injector, thus escaping without encountering any appreciable resistance.

The invention thus makes it possible to perform the filling operation at a very high speed while ensuring concomitant degassing in a short time with a high degree of efficiency.

Preferably, the injection and discharge element is a single injector provided with the filling duct and with the discharge duct and inserted in a single orifice of the casing. This single injector is advantageously a pipette that can be cut-off. The operating conditions are preferably such that the resin completely fills the interior of the casing up to the discharge duct.

According to a second aspect of the invention, the electrical device of the type indicated at the outset is distinguished by the fact that an orifice provided in the casing of the device for introduction of resin and discharge of air during manufacture exhibits on completion of the filling operation a visible resin surface having two leading portions of resin flux, namely an inlet flux leader and a discharge flux leader.

BRIEF DESCRIPTION OF THE DRAWINGS

FIGS. 1 to 3 are sectional views of a proximity detector in accordance with the invention during different stages of the method.

FIG. 4 is a sectional view to a large scale showing the injector of FIG. 2 before it is placed in position.

FIGS. 5 and 6 are views which are similar to FIG. 4, with portions broken away, respectively after positioning of the injector on the electrical device, then after filling of the device with resin.

FIG. 7 is a top view of a detail of the electrical device which has been filled with resin.

DETAILED DESCRIPTION OF THE INVENTION

Figure 8:
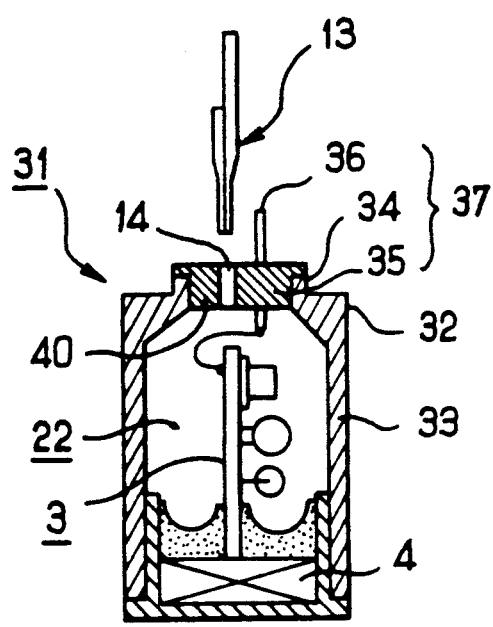
FIGS. 8 and 9 are sectional views which are similar to FIG. 1 and show two alternative forms of construction of detectors in accordance with the invention.
Figure 9:
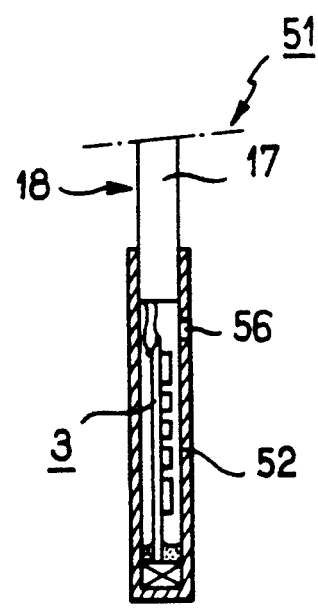

The electrical devices concerned in the present invention consist of inductive proximity detectors as illustrated in FIGS. 1, 8 and 9. However, these detectors are considered solely by way of example and not in any limiting sense.

A first type of detector 1 shown in FIG. 1 in the state which precedes the introduction of resin includes a cylindrical shell 2 having an axis X—X', an electronic device 3 which is constituted by a preliminary assembly of a wire-wound sensing probe 4 with a printed circuit card 5 which carries components 6. In this instance, the assembly is formed by means of a mass 7 of suitable resin which also establishes a mechanical connection between the above-mentioned elements 4, 5 and a cup 8 having a skirt 9. The cup 8 houses the probe 4 while the front end-wall of said cup constitutes a closure disk for one end 10 of the cylindrical shell.

A plug 11 placed at an opposite end 2a of the cylindrical shell has an internal skirt 12 tightly engaged in the end portion 2a of the shell and a suitably cylindrical orifice 14 which extends right through the end-wall of the plug. Said plug 11 also has a central opening 16 through which the sheath 17 of an electric cable 18 is passed in a tight fit.

The skirt of the plug and the skirt of the cup are applied in a close and compliant fit against the internal cylindrical surface of the shell.

The electric cable 18 contains insulated conductors 19, 20, 21, the bared ends of which are electrically connected to suitable points of the device 3 within the casing formed by the cylindrical shell 2, the cup 8 and the plug 11, a vacant internal space 22 being defined by said casing.

The orifice 14 serves on the one hand to fill the casing with a hardenable resin 22' (FIG. 3) which is supplied under pressure under the action of centrifugation forces and on the other hand to carry out simultaneous removal of air which is initially present within the internal space 22. In order to perform this double operation, the nozzle 25 of a double-duct injector 13 in the form of a pipette which is advantageously made of plastic is inserted in the orifice 14 and the other end 28 of the injector is connected to a resin supply device (see FIG. 4). At the time of insertion, the nozzle 25 having a chamfered tip 27 penetrates into the orifice 14 until a slightly convergent conical outer surface 26 of said tip is applied in leak-tight manner against a surface 15 which delimits the orifice 14 (as shown in FIG. 2).

In order to perform its double function of introduction of resin and of degassing, the injector has two adjacent ducts 41 and 42 separated by a thin partition-wall 43. The feed duct 41 serves to supply the resin while the discharge duct 42 serves to remove the air, then to discharge a slight excess quantity of resin. In the operating position, the duct 42 is located above the duct 41.

When the detector has been placed for example horizontally in an eccentric position on a centrifugation rotor 60 having an axis Y—Y' (FIGS. 1 and 5) perpendicular to X—X', the rotor is set in rotation while admitting a predetermined quantity of resin into a central zone 66 of the rotor under controlled conditions. The resin thus passes from the central zone 66 of the rotor to the interior of the casing 22 via the duct 41 and the orifice 14. The air escapes through the orifice 14 and the duct 42.

To this end, the duct 42 which is of greater length than the feed duct 41 projects into the central zone 66 of the rotor towards the axis Y—Y' of said rotor. During centrifugation, the resin 217 which is introduced into the central zone of the rotor forms a ring 218 at the periphery of the central zone 66 by passing beneath the duct 41. The duct 42 forms within the chamber 66 a projection which is greater than the radial dimension of the ring 218, with the result that it remains free of resin while air escapes into the upper region of the zone 66 which thus forms an air escape volume (as shown in FIG. 5). When all of the air has escaped, the resin flows back through the duct 42 until achievement of the final situation shown in FIG. 6 in which the necessary quantity of resin has been entirely introduced and the air has been completely discharged.

When the resin has hardened, the tip of the injector 13 is cut-off in close proximity to the orifice 14 along the plane P. FIG. 7 shows the appearance of the detector 1 in the vicinity of the orifice 14 with two flux leaders of resin which has hardened in the cut-off portions of the ducts 41 and 42 of the injector 13.

It will be noted that a detector which has been filled with resin in accordance with the invention has a characteristic appearance with its two resin flux leaders. The simultaneous presence of these leaders makes it possible to ensure by checking that the air within the casing has been completely removed and that no accessible hollow spaces remain therein.

A second type of detector 31 which is visible in FIG. 8 is similar in design to the detector mentioned above except in regard to the end portion 32 of the cylindrical shell 33 which is remote from the probe 4. This end portion 32 has a neck 34 in which is engaged a plug 35. The outer face of said plug is adapted to carry conductive through-pins such as the pin 36 which are insulated with respect to each other so as to form a base 37 designed to receive a removable connector (not shown in the drawings).

In a third type of detector 51 which is shown in FIG. 9, the cylindrical shell 52 has an internal diameter substantially equal to the external diameter of the sheath of the cable 18 so that, after insertion of the cable 18 within the cylindrical shell 52, the corresponding end of the shell is made air-tight. A lateral hole 56 is formed in the shell 52 near the cable-insertion end thereof and corresponds in diameter to the nozzle of the injector 13 in order to permit air-tight fitting of the injector nozzle within said hole. At the time of centrifugation, the axis X—X' of the detector can be placed in parallel relation to the rotor axis.

The use of a field of centrifugation forces several hundred times higher than that of gravity proves extremely advantageous in order to carry out air blow-out and rapid filling of the internal space but also in order to facilitate the discharge of residual air bubbles which would otherwise be liable to nestle around certain components. In addition, perfect adhesion is acquired between on the one hand the mass of resin 22' which occupies the internal space 22 and on the other hand the internal wall of the cylindrical shell, the pre-mounted subassembly 3, the cable sheath and the plug (when present).

In accordance with the invention, preference is given to a hardenable resin which may be composite, which is endowed at the same time with good electrical insulating properties, low viscosity, high fluidity, a short hardening time at room temperature, is low in capital cost and exhibits low volume shrinkage during the hardening stage, as well as good performances of adhesion to the plastic or metallic material of the casing.

What is claimed is:

1. An electrical device provided with a casing adapted to accommodate electrical components (5, 6), in particular a proximity detector in which a sensing probe (4) is placed at one end of the casing while an opposite end of said casing is adapted to accommodate insulated electrical connection means (18, 36) for supplying the detector and transmitting signals delivered by said detector, said components being embedded in a hardened insulating resin within said casing, said electrical device comprising furthermore an orifice (14) through which a resin surface is visible and which comprises a visible flux inlet leading portion and a visible flux discharge leading portion.

2. An electrical device according to claim 1 wherein said orifice (14) comprises a portion wherein two duct portions are visible, said inlet portion being located in one of said two duct portions and said discharge leading portion being located in the other of said two duct portions, said ducts portions being a cut-off end portion of a resin injector having a first duct for introduction of resin and a second duct for discharge of air.

3. An electrical device according to claim 1 wherein the casing comprises a cylindrical shell (2, 33) and a plug (11, 35) through which conductors (18, 36) are passed, said plug being tightly fitted in an opening of the cylindrical shell at the end remote from the probe (4), wherein the orifice (14) extends through the plug (11, 35) in a direction parallel to a longitudinal axis of the shell.

* * * * *